June 4, 1957

G. J. GIBSON 2,794,898

COMPOSITE ELECTRODE

Filed Sept. 18, 1953

INVENTOR
GLENN J. GIBSON
BY
ATTORNEY

United States Patent Office 2,794,898
Patented June 4, 1957

2,794,898

COMPOSITE ELECTRODE

Glenn J. Gibson, Berkeley Heights, N. J., assignor to Air Reduction Company, Incorporated, New York, N. Y., a corporation of New York Application September 18, 1953, Serial No. 381,070

2 Claims. (Cl. 219—75)

This invention relates to inert gas shielded metal arc welding and more particularly concerns such welding in which a non-consuming electrode is used.

As is well-known in the arc welding art, the inert gas shielded metal arc welding process using a non-consuming electrode is a method of welding in which an arc is struck between the work-piece and the non-consuming electrode, such as a tungsten electrode, to produce the necessary welding heat while the arc and weld area are shielded by an inert gas, such as argon or helium. The filler metal when required is supplied to the weld area usually in the form of a wire supplied from a reel or in the form of a stick or rod, both made from a material suitable for the particular welding job.

In commercial torch apparatus used in the above described welding, the holding means or collet for the tungsten electrode is spaced upwardly from the orifice of the gas nozzle. The electrode holding means or collet also constitutes the means for transferring the welding current to the electrode. In this arrangement, a more-or-less fixed length of the electrode extends from the collet axially through the surrounding gas nozzle and projects slightly beyond the horizontal plane of the orifice of the gas nozzle. The inert gas thus flows along the electrode without interference and the discharged gas effectively shields the end of the electrode, the arc formed between the tip of the electrode and the work piece and also shields the weld area.

When welding in the manner above outlined, it is well known that a conventional tungsten electrode of a given diameter can carry electrical currents only up to some maximum amperage under given conditions. Above this amperage, the electrode fails by melting due to the heat generated at the arc and the resistance heating in the electrode itself. Efforts and proposals, such as the use of thoriated tungsten to reduce the arc heating and improved water cooling to dissipate the heat in the electrode, have been made for increasing the current carrying capacity of an electrode of a given diameter so that certain advantages can be obtained. Thus, if a tungsten electrode of a given diameter carries more current without failure, it is apparent that there will be a conservation of a costly critical material since the increased current permits faster welding with the same amount of the tungsten. An additional advantage, which results if an increased current carrying capacity is obtained, resides in the fact that a more stable arc results when an electrode element of a given diameter carries a larger current to the arc.

It is the primary object of this instant invention to provide a method and means for increasing the current carrying capacity of a non-consumable electrode element of a given diameter which is used in inert-gas-shielded, arc welding.

This object is accomplished, in the preferred embodiment of the instant invention, by means of a composite electrode. This composite electrode resulted from a determination that the electrical resistance in the conventional electrode itself between the collet and the tip of the electrode was the major source of the heating which caused the electrode to fail by melting. It was then discovered that, with the instant composite electrode, the step of carrying the welding current to a point close to the arc before it passes through a short length tungsten electrode element can be accomplished and hence that the electrode element can carry higher currents without failure. The preferred composite electrode is comprised of a tungsten center or electrode element and a properly-dimensioned copper tube swedged on the tungsten center. With this construction, the copper tube carries most of the welding current up to the location where a short arc tip section of the tungsten element projects and hence the resistance heating of a relatively long length of tungsten is avoided.

Another problem encountered in conventional inert gas-shielded, metal-arc welding using a non-consuming electrode is the economic loss entailed by the inability to use the stub end of the expensive tungsten electrode, after it is slowly consumed due to the intense heat of welding. As above-mentioned, it is necessary to have the collet an appreciable distance from the tip of the electrode so that the structure for providing an effective gas shield at the arc can be accommodated. With this arrangement, it is apparent that there is an appreciable length of electrode extending from the collet towards the arc or stub end which cannot be used.

Another object of the instant invention is to provide a non-consuming type electrode which avoids the problem of stub end losses. This object is accomplished by making the instant composite electrode so that the copper tube extends beyond the end of the tungsten center. With this construction the portion of the copper tube which extends up from the tungsten center can be gripped by the collet and practically all of the tungsten center is used.

The manner in which, and means by which, the foregoing objects and others are accomplished, along with the advantages and the features of the invention, will be apparent from the following description and the accompanying drawing.

A manual, water-cooled, gas-shielding electrode holder or welding torch suitable for effecting the instant invention and the preferred form of the instant non-consuming composite electrode are shown in the accompanying drawings, in which.

Figure 1:
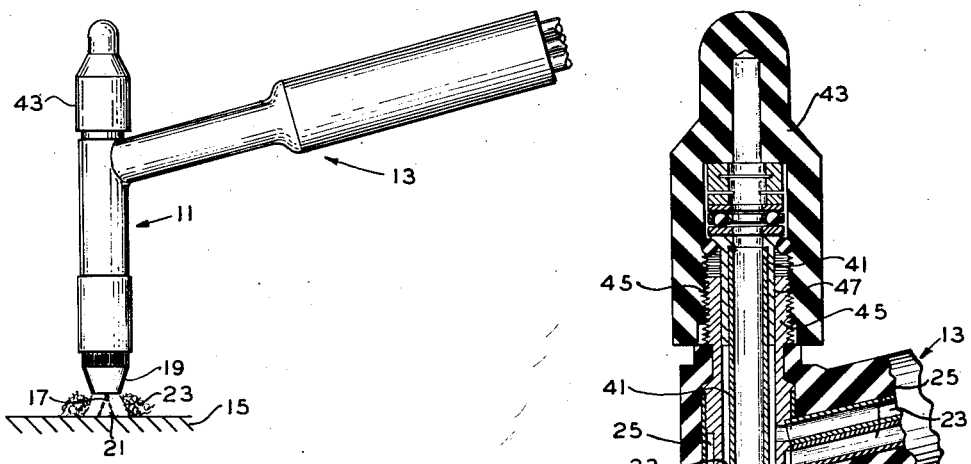
Fig. 1 is a side elevation of the welding torch shown in relation to a work-piece.

Referring to Fig. 1, it can be seen that the welding torch has a vertically-disposed barrel portion 11 and a handle 13 extending from the barrel 11 at angle which is slightly inclined upwardly from a horizontal plane. Below the lower end of the barrel portion 11, a work-piece 15 is shown. The electrode 17 projects downwardly from the inert gas nozzle 19 of barrel portion 11. The inert-gas shield or stream, surrounding the arc 21, is indicated by reference numeral 23.

Figure 2:
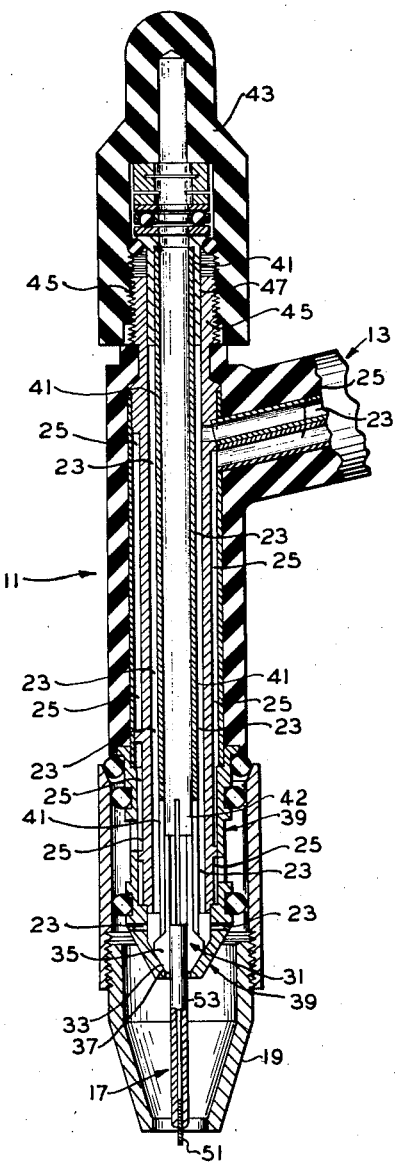
Fig. 2 is an enlarged vertical section of the barrel portion only of the welding torch shown in Fig. 1 and shows the utilization of the terminal part of the tungsten center.

The details of the barrel portion of the welding torch are shown in Fig. 2. This water-cooled torch including the means for getting the water, inert gas and electricity from supply sources to the torch is described and illustrated in the copending application S. N. 213,446, filed by N. E. Anderson et al. on March 1, 1953 (now U. S. Patent #2,659,797, issued November 17, 1953) and assigned to the assignee of the instant application. The following description will include only those details of this Anderson et al. device which are pertinent to the instant invention.

The inert shielding gas flows in path 23 from handle 13 down through an annular passage in barrel 11 and then into gas nozzle 19. It is to be noted that gas nozzle 19 constitutes the means for providing an effective gas shield about the electrode 17 and the weld area. In order to do so, it is necessary to have the electrode holding and aligning means, described hereinafter, spaced from the discharge opening of the gas nozzle 19. Due to this typical construction, it is apparent that the welding current would flow through an appreciable length of the conventional tungsten electrode as above-mentioned. It is also apparent that heat generated by the flow of current in the conventional electrode would also have to be conducted appreciable distances in order to reach the heat-dissipating metallic mass formed by the electrode holding and aligning means.

The water-cooling circuit 25 also starts at the handle 13 and flows down and up in the barrel in paths which are located exteriorly of the inert gas path. This circuit 25 includes paths which convey water down from the handle 13 to a location which is adjacent the electrode holding and aligning means and back up to the handle 13 which contains an "in" tube and an "out" tube, placed parallel to each other at the same location in the handle. The details of the water circuit can be ascertained by reference to the aforementioned Anderson et al. application.

The electrode holding and aligning means includes (1) the axial tubular copper collet 31 which has the tapered exterior faces 33 of its jaws 35 bearing against mating interior surfaces 37 of the copper collet sleeve 39 and (2) the stainless steel collet tube 41 which extends upwardly from the collet 31 and has its lower portion formed into collet fingers 42. The fingers are preferably brazed to the upper part of the collet, above the thicker, knob-like lower portions or jaws of the collet. The collet 31 also has slots extending vertically and completely therethrough and these slots are aligned with the slots which form the fingers of the collet tube 41. The slots are preferably formed by vertically slotting the collet and collet tube at four equispaced points after they are brazed together. The proper amount of resiliency is assured by the stainless steel fingers which are attached to the collet. The proper electrical contact and gripping action between the electrode and the collet is assured by the aforementioned resiliency, the collet actuating means which forces the collet into contact with the electrode, and the arrangement of the inclined faces at the bottom of the copper collet and the inner bottom portion of the copper collet sleeve.

The upwardly extending portion of the collet tube 41 is acted upon by the collet actuating knob 43 and its associated structure so that the tube 41 and attached collet 31 are urged downwardly for gripping and contacting the electrode. The downward thrust is transmitted to the collet 31 so that its jaws 35 are urged inwardly by the cam action of interior surfaces 37 of the collet sleeve 39 to effect a tight grip and an effective electrical connection between the collet 31 and the electrode 17. As with the water cooling circuit, the details of the collet actuating means can be ascertained by reference to the above-mentioned Anderson et al. application. For the purposes of the instant invention it is sufficient to know that the collet axially aligns, grips and releases the electrode and constitutes the means for passing the welding current from certain internal metallic parts of the barrel to the electrode. The complete path of welding current is also set forth in detail in the aforementioned Anderson et al. application. For an understanding of the instant invention, it is sufficient to know that the current passes from the collet sleeve 39 to the collet 31 and hence to the electrode 17.

It can be noted that rotation of the knob 43, as it is threaded on body member 45 of the barrel portion, urges collet tube downwardly since thrust sleeve 47 will push the collet tube downwardly, as above suggested. Thus, it can be seen that if the collet tube 41 is moved axially in a downward direction, the conical faces on the stationary collet sleeve 39 produce a cam action on the collet jaws which forces them inwardly into tight engagement with the electrode. When it is desired to release the grip of the collet for moving the electrode downwardly, the knob is merely threaded off and the resiliency of the collet structure and the cam action will "open" the collet. In some instances, it is possible to release the electrode merely by tapping the electrode, since there is some resiliency in the structure above the thrust sleeve 47 within knob 43.

It is to be noted that the segment of the composite electrode shown in Fig. 2 is comprised of a very short tungsten center element 51; and, exteriorly thereof, a longer copper tube 53 which surrounds the tungsten center and extends upwardly beyond the top of the tungsten center element through the gas nozzle into contact with the collet jaws 35. This showing serves to illustrate that there is relatively no stub end loss of the expensive tungsten since a length of tungsten is not required to extend from the arc up to the source of electricity in the torch as is necessary with conventional tungsten electrodes. In place of this conventional length of tungsten, the top portion of the copper tube serves to pass the welding current to the short tungsten arc tip section.

Figure 3:
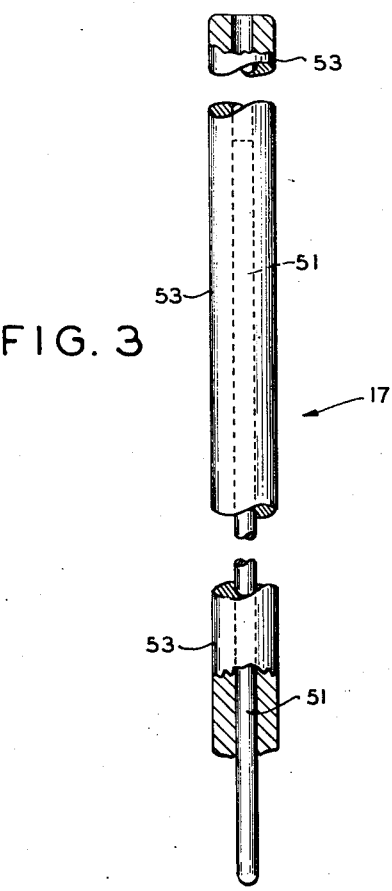
Fig. 3 is an enlarged, broken and partially cross-sectioned view of the instant composite electrode.

Referring now to the Fig. 3 showing of the composite electrode per se, it can be seen how the above-described structure which prevents stub end losses is provided in the fabrication of the electrode. The tungsten center or electrode element 51 of the electrode 17 extends up in the thick copper tube 53 to a point which is about 1½ inches from the top of the copper tube 53. The copper tube can be attached to the tungsten center in any manner which will assure that the welding current flows through the copper until a point quite adjacent the arc tip section of the tungsten center 51 and then flows to and through the tungsten tip section. The preferred method of fabrication or bonding which gives good electrical contact is to swedge the copper tube on the tungsten center so that the copper tube intimately contacts the tungsten center throughout the length of tungsten center. It is also preferred that the tungsten center project about a quarter of an inch from the bottom of the copper tube. It is to be noted that the copper tube mechanically strengthens the tungsten center and so tends to prevent breakage of the tungsten center.

The copper tube of the illustrated electrode has an inside diameter of about 0.040 of an inch and an outside diameter of about ⅛ of an inch. The tungsten center, of course, has a diameter of about 0.040 of an inch. With these dimensions the ratio between the cross-sectional areas is about 9 to 1. This is the preferred area ratio for copper and tungsten cross-sectional areas. With this ratio, the percentage of any current carried by the copper is about 96 percent of the total current at room temperature since the ratio of conductivities is about 3 to 1, copper to tungsten. This room temperature percentage is the preferred percentage of current flow. The foregoing, of course, relates to the encased part of the electrode element since, as pointed out, the unsheathed tungsten arc tip section will carry all of the current for its short length. It is to be understood that other similar low melting point and low electrically resistant metals, such as aluminum, can be used in place of copper provided the low electrically resistant metal is dimensioned to carry about the same quantity or percentage of current as does the copper tube at room and welding temperatures. Thus, with other such metals, the dimensions of the tungsten or high melting point center element and the encasing tube should be so proportioned that the tube will carry about 96 percent of the current at room temperatures. Stated conversely, the electrode center element of the sheathed electrode should carry about 4 percent of the current at room temperature. It is also to be understood that metals having characteristics which are comparable to tungsten such as tantalum and molybdenum can be used in place of tungsten.

In operation, a welding operator inserts the composite electrode 17 in the holding means or collet 31 in such a manner that the tip of the electrode extends the proper distance from the gas nozzle 19 and a suitable electrical contact exists between the electrode 17 and the holding means 31. The arc is then struck; and, if the composite electrode has not been fabricated with the preferred ¼ of an inch projection of the tungsten center, the copper tube 53 melts back to a point about a quarter of an inch from the tip of the tungsten center 51.

During welding, current passes from collet 31 to the copper tube 53 of the composite electrode which it contacts and then the principal part of the current passes through the copper tube towards the end thereof which is near the arc. Adjacent this location, the current which has passed from the collet 31 through the copper tube 53 will flow to and through the tungsten center element 51 to the welding arc. In this manner, it is apparent that the heat and its adverse effects due to a large current passing through an appreciable length of the tungsten is avoided; and so larger currents can be used, since the total heat generated in the tungsten center in the short quarter-of-an-inch length is small when compared to prior practice in which all of the welding current passes through an appreciable length, such as 1½ inches, of tungsten.

During welding, the tungsten is slowly consumed and the electrode is advanced in small increments by means of collet-actuating cap 43 or by tapping the tip of the electrode. After a period of time during which many advances of the electrode have been made, the composite electrode will be in the position shown in Fig. 2. This showing indicates the manner of avoiding stub-end losses which is provided by the instant invention, as above explained. It can be appreciated that only a very small length of tungsten will exist when the welding operation will need to be stopped in order to replace the electrode.

It is to be understood that, during operation, the electrode 17 is positioned in the welding torch so that the tip of tungsten center extends out about a quarter of an inch from the plane of the opening of the inert gas nozzle. Thus, the end of the copper tube will be approximately in the transverse plane of the gas nozzle. It is also to be understood that, during operation, inert gas shielding is effected and preferably water cooling is also effected. When the electrode is adjusted during welding to provide for the proper projection of the tungsten center, as above mentioned, a small amount of the copper tube will be melted off.

The extent of the advantages resulting from the discovery that the instant composite electrode will function and give tungsten centers increased current carry capacities is apparent from the following table which records data from certain welding operations:

*Current capacity of electrodes for D. C. straight polarity welding*

| Electrode dia. | Dia. of copper | Helium | | Argon | |
|---|---|---|---|---|---|
| | | Pure Tungsten | Thoriated Tungsten | Pure Tungsten | Thoriated Tungsten |
| .040 | 0 | 90 | 100 | 100 | 90 |
| .040 | 3/32 | ------ | 150 | 135 | 115 |
| .040 | 1/8 | 150 | 200 | ------ | 175 |
| 1/16 | 0 | 200 | 190 | 195 | 195 |
| 1/16 | 1/8 | ------ | 275 | ------ | 225 |

The above diameters are given in fractions of an inch and the currents in amperes under the headings for the two types of tungsten. It is to be appreciated that zirconiated tungsten will give comparable results. The headings, helium and argon, indicate the type of gas shielding.

From the foregoing table, it is obvious that the current carrying capacity of a given size tungsten element is greatly increased. For the 0.040 of an inch thoriated tungsten element with helium shielding, there is about a 100 percent increase when the tungsten element has the ⅛ of an inch diameter copper tube swedged thereon, which composite electrode is illustrated herein. This particular composite electrode carries the current (200 amperes) which is conventionally possible with a bare tungsten electrode having over 200 percent more cross-sectional area than the area of the tungsten in the composite electrode, since a tungsten electrode having a diameter of 1/16 of an inch usually is rated to carry about 200 amperes.

The aforementioned preferred percentage (96 percent) of current carrying capacity at room temperature of the low electrically-resistant metal is derived from the foregoing table. Thus, since the relative conductivity of copper to tungsten is about 3 to 1 and the corresponding relative areas are about 9 to 1 with the above-mentioned particular electrode, the copper flow path for electric current at room temperatures would carry about 96 percent of the current since the current would be divided in a copper-to-tungsten ratio of about 27 to 1. As above stated, the converse expression of this preferred feature would involve providing for passing about 4 percent of the current through the part of the electrode which is a terminal for the arc at room temperature. It is impossible to determine precisely the actual relative flows of current during welding operations due to the varying increased resistivity of both tungsten and copper at the operating temperatures which in turn vary depending on the distance from the arc. However, it is apparent that, even at the high temperatures encountered during welding, the principal part or most of the current flows in the copper portion of the composite electrode up to the location adjacent to where the tungsten center is not encased by the copper.

It is also to be noted that many of the proportionings of the instant composite electrodes provide a welding operation in which the current density of the short arc tip section of the tungsten center exceeds about 120,000 amperes per square inch. This density can be readily calculated from the foregoing table. For the helium-shielded, thoriated tungsten electrode element having a 0.040 diameter and a ½ of an inch copper tube the current density is about 159,000 amperes per square inch.

Another advantage of the instant invention resides in the fact that the good-heat-conductive copper tube also conducts appreciable amounts of heat from the tungsten tip back to the relatively cold collet which is preferably water-cooled and so the tube further contributes to increased current carrying capacities. A further advantage which results is that the copper sheath protects and strengthens the tungsten center and hence prevents breakage of the tungsten element, as sometimes occurs when the tungsten sticks to the workpiece.

From the foregoing, it is believed apparent that appreciable savings in welding costs are realized by the instant invention since faster welding is effected with a given quantity of an expensive and critical material.

It is to be understood that the disclosed electrode holder can be modified so that the collet 31 is removed from a location adjacent the gas nozzle 19 provided means are included for maintaining the electrode in the center of the gas shield without interference with the gas flow and the full advantages resulting from increased current carrying capacity are not desired.

It is also to be understood that the invention has utility with, and will give advantages with, D. C. reverse polarity and A. C. welding.

Although a preferred embodiment of the invention has been specifically described and illustrated, it will be apparent to one skilled in the art that various changes and modifications might be made without departing from the spirit of the invention as defined in the following claims.

I claim:

1. A welding apparatus for metal-arc, inert gas-shielded welding comprising a torch having a relatively long and continuous hollow interior portion for receiving an elongated composite electrode extending along the center line of said portion; clamping means in said torch for gripping said electrode and for repositioning said electrode when appreciably reduced in length; said torch also having a gas nozzle with a circular orifice extending below said clamping means whereby said inert gas effectively shields said welding arc, welding area, and electrode end, said nozzle orifice spaced about 1½ inches from said clamping means; said electrode consisting of a tungsten rod and a copper tube swedged on said rod and positioned so that an end of the tungsten rod serves as a terminal for an inert gas-shielded arc; said copper tube and said tungsten rod each initially having a length substantially greater than 1½ inches; said copper tube having an annular cross-sectional area which is at least three times as large as the cross-sectional area of said tungsten rod; and said copper tube extending at least 1½ inches beyond the end of said tungsten rod opposite the terminal-serving end to form a hollow extension whereby said tungsten rod is completely utilized as said rod is advanced by said holding means when said rod is appreciably consumed.

2. A welding apparatus in accordance with claim 1 and further characterized in said tungsten rod having a uniform circular cross-section and a diameter between about 0.040 and 0.063 of an inch.

References Cited in the file of this patent

UNITED STATES PATENTS

| | | |
|---|---|---|
| 1,105,887 | Dake | Aug. 4, 1914 |
| 1,176,614 | Stanley | Mar. 21, 1916 |
| 1,180,614 | Simpson | Apr. 25, 1916 |
| 2,431,334 | Lambert | Nov. 25, 1947 |
| 2,512,706 | Anderson | June 27, 1950 |
| 2,514,060 | Himmelman | July 4, 1950 |
| 2,554,236 | Bernard | May 22, 1951 |
| 2,586,516 | Cobine | Feb. 19, 1952 |

FOREIGN PATENTS

| | | |
|---|---|---|
| 878,797 | France | Oct. 26, 1942 |